March 9, 1965
P. I. D'ANTINI
3,172,683
SAFETY CUSHION FOR VEHICLES
Filed Dec. 19, 1961
3 Sheets-Sheet 1
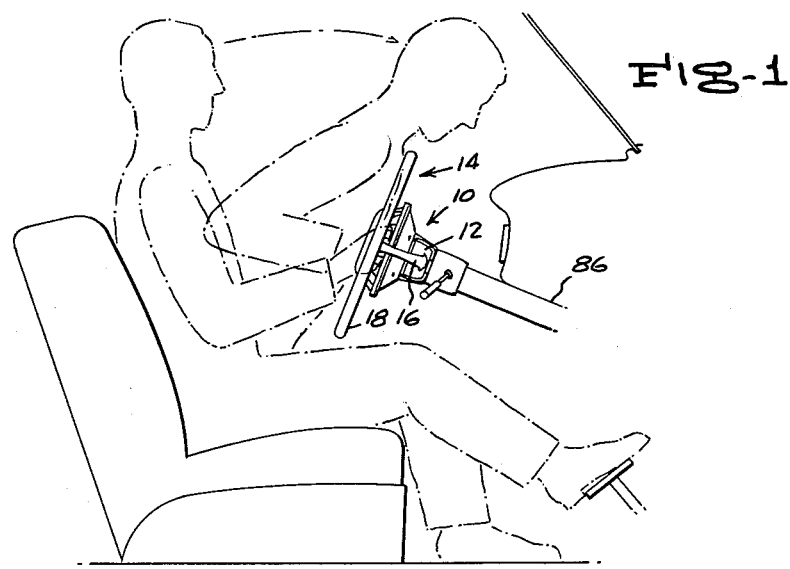
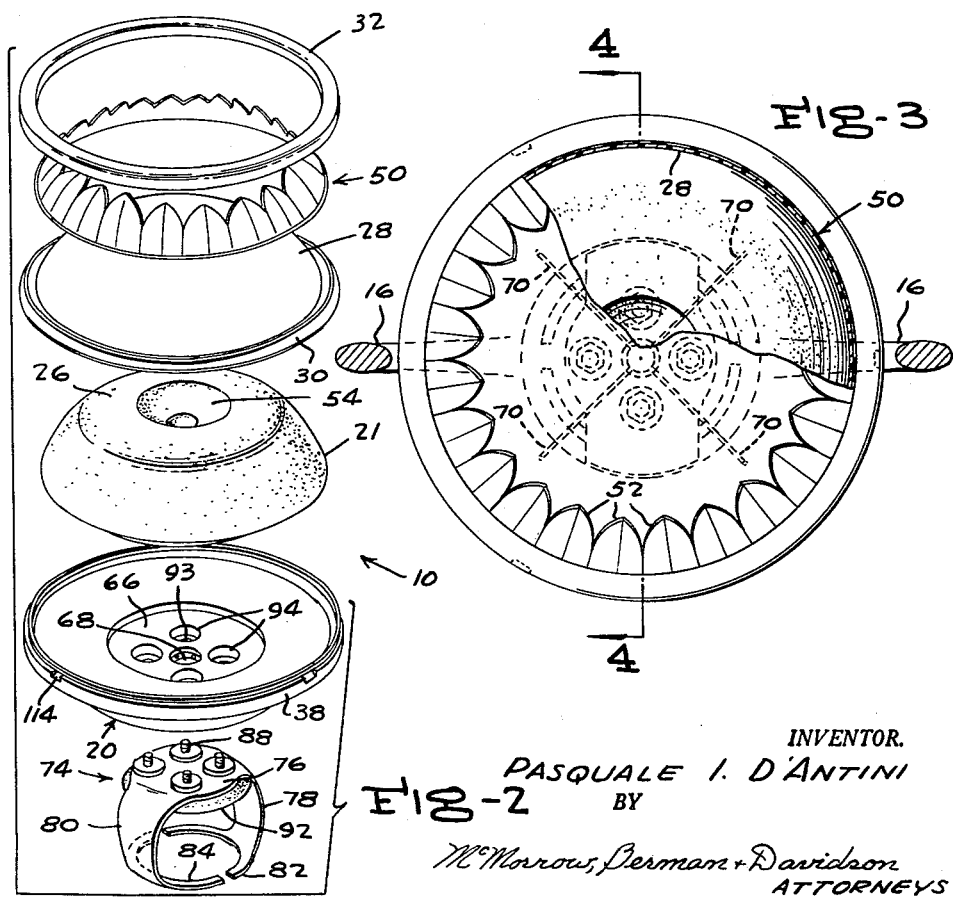
INVENTOR.
PASQUALE I. D'ANTINI
BY
McMorrow, Berman + Davidson
ATTORNEYS March 9, 1965
P. I. D'ANTINI
3,172,683
SAFETY CUSHION FOR VEHICLES
Filed Dec. 19, 1961
3 Sheets-Sheet 2
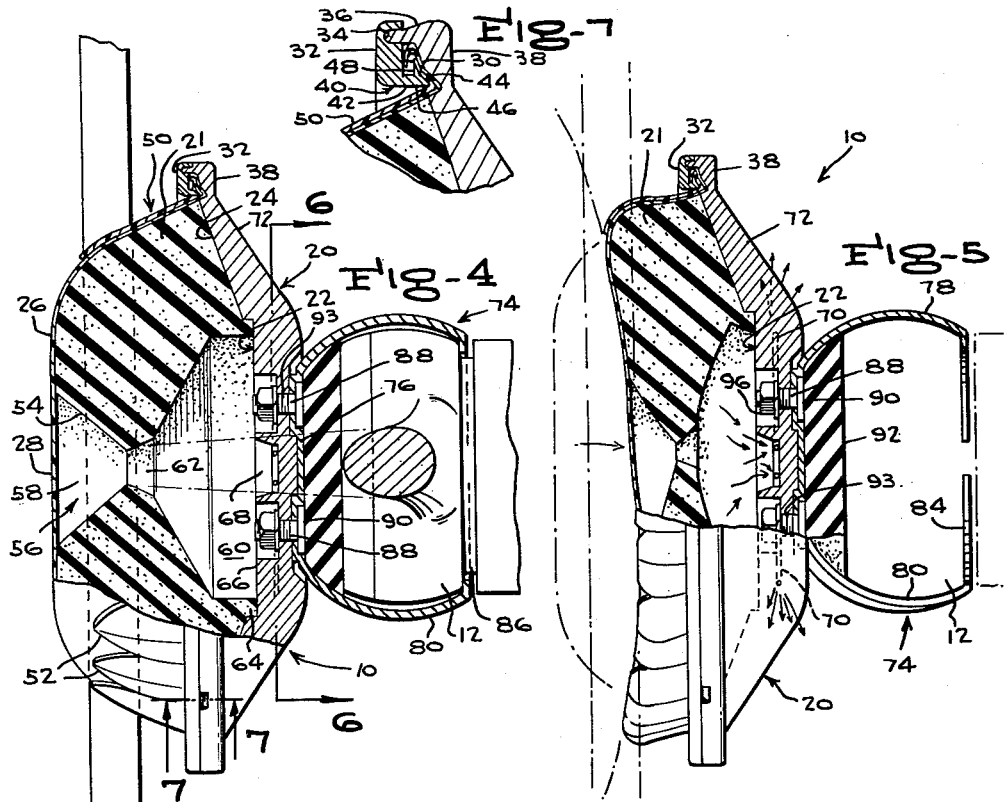
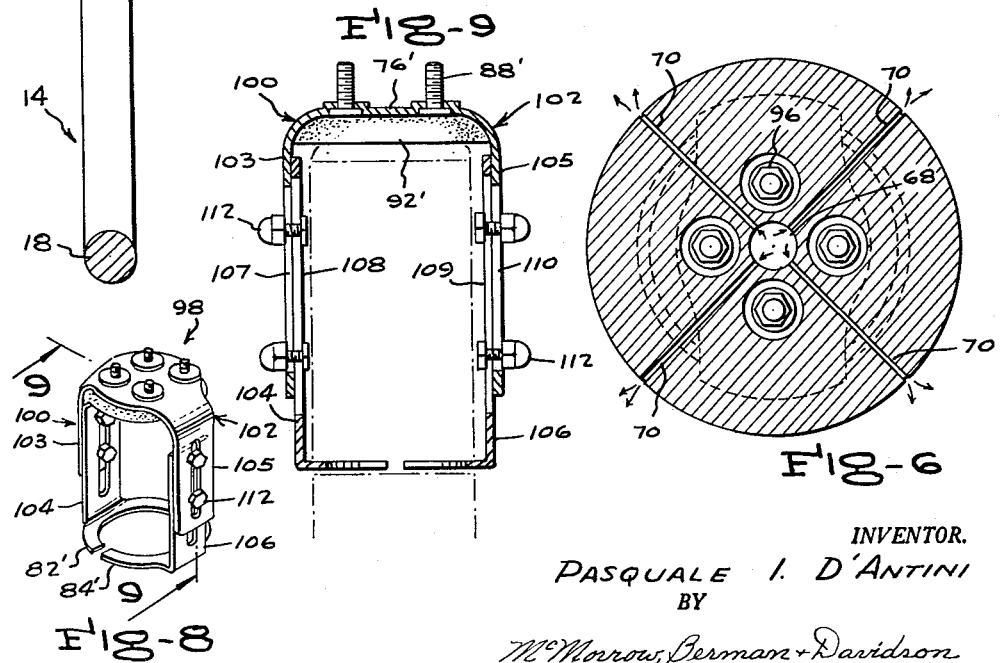
INVENTOR.
PASQUALE I. D'ANTINI
BY
McMorrow, Berman & Davidson
ATTORNEYS

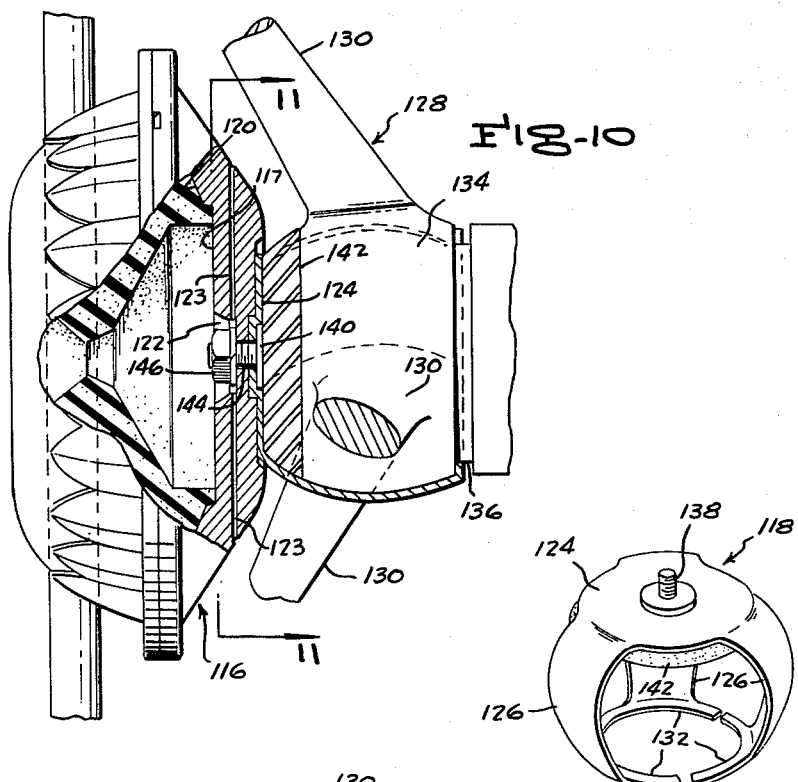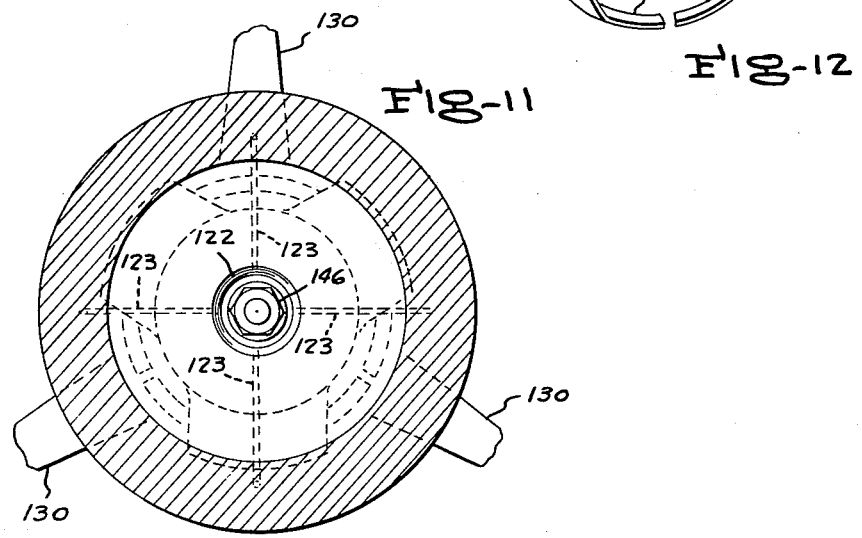

United States Patent Office 3,172,683
Patented Mar. 9, 1965

3,172,683
SAFETY CUSHION FOR VEHICLES
Pasquale I. D'Antini, 1545 Birchmont Road,
Scarborough, Ontario, Canada
Filed Dec. 19, 1961, Ser. No. 160,542
11 Claims. (Cl. 280—150)

This invention pertains to safety cushions for vehicles and, more particularly, to a safety cushion which may be easily attached to the steering wheel of an automobile or to any other part of a vehicle in order to protect the driver and passengers during a collision involving the vehicle.

It is a commonly known fact that many passengers or drivers of vehicles suffer severe injury or death during an automobile accident or collision when, by reason of the sudden deceleration of the vehicle, the individual is hurled forwardly against the dashboard, wheel, or other rigid portions of an automobile body.

Considerable research has been devoted to the satisfactory solution of this problem and has resulted in the development of such safety features as padded dashboards, inflatable cushions, seat belts, and the like. In recognition of the specific problem associated with a steering wheel, there has also evolved a steering wheel with a recessed hub which tends to reduce the danger of being impaled upon the steering column after the rim of the steering wheel has been broken.

All of the efforts to date have been directed to padding or otherwise cushioning the impact of a forwardly hurled body without resolving the ancillary problem which occurs when the chest of an individual meets one of the aforementioned cushions or pads with considerable impact; viz., the head of the driver or passenger does not stop in its forward movement, but rather continues and results in a cervical strain or injury commonly known as "whiplash," which refers to the snapping or pivotal movement of the head and neck about the upper end of the spinal column. Such injury may also occur when the body of a driver or passenger is thrown violently rearwardly during an accident or collision.

Therefore, the present invention is directed to providing a safety cushion which will not only act to protect the chest of a driver or passenger when thrown against a steering wheel or dashboard, but will also be extremely effective in eliminating the "whiplash" neck injuries.

An object of the invention is to provide a safety cushion which combines the impact absorbing characteristics of a resilient cushion with a unique energy dissipating means including constricted egress passages for air contained within the cushion.

Another important object of the present invention is to provide a safety cushion which has a safe rate of compression as well as a safe rate of recovery which cooperate to gradually absorb the impact of a body upon the cushion and also prevent "whiplash" injury from occurring by recovering from the impact in a gradual and uniform manner.

A still further important object of the invention is to provide a safety cushion which can effectively absorb the impact of a body by bringing about a gradual, uniform, and constant deceleration, and yet has a satisfactory manner of recovery so as to be reused on future occasions, if needed.

A still further object is to provide a safety cushion which may be easily connected to steering wheels of all the existing models of automobiles and, if desired, can be readily detached in order to be moved from one automobile to another.

A further object of the invention is to provide a safety cushion which is sturdy, durable, and relatively inexpensive to manufacture.

Other objects and advantages of the invention will become apparent from a consideration of the following description and accompanying drawings which set forth the preferred embodiments of the invention and, wherein:

FIGURE 1 is an elevational view showing the safety cushion of the present invention mounted upon the steering wheel of an automobile;

FIGURE 2 is an exploded perspective view of the safety cushion;

FIGURE 3 is a plan view with parts broken away;

FIGURE 4 is a sectional view taken along the line 4—4 of FIGURE 3;

FIGURE 5 is an elevational view, with parts in cross-section, showing the impact absorbing action of the invention when a body is hurled thereon;

FIGURE 6 is a cross-sectional view taken along line 6—6 of FIGURE 4;

FIGURE 7 is an enlarged detail sectional view taken along line 7—7 of FIGURE 4;

FIGURE 8 is a perspective view of a modified form of the clamp of the present invention;

FIGURE 9 is an elevational sectional view taken along line 9—9 of FIGURE 8 of the modified form of the clamp;

FIGURE 10 is an elevational view of another modified form of the clamp, having parts broken away in cross-section;

FIGURE 11 is a sectional view taken along line 11—11 of FIGURE 10; and

FIGURE 12 is a perspective view of the modified form of the clamp of FIGURE 10.

Referring now to the accompanying drawings wherein like reference numerals indicate like parts throughout the figures, reference numeral 10 refers generally to the safety cushion of this invention which may be mounted upon the hub 12 of the steering wheel 14 in such a manner as to overlie a substantial portion of the steering wheel spokes 16 as well as the hub 12 while positioned within the rim 18 of the wheel.

As will be seen from FIGURES 4 and 5, the safety cushion consists of a circular base 20 having a general concavo-convex shape. A resilient pad 21, formed of a material such as sponge or foam rubber, is positioned upon the inner convex surface 22 of the base 20 and is conformably shaped to fit the inclined portion 24 thereof. The pad 21, having the general shape of the frustum of a cone, presents a broad front side 26 for receiving the impact of a body hurled against it which, in the case of safety cushion 10 mounted upon the steering wheel 14, would be the chest of the driver, as shown in FIGURE 1.

An impermeable flexible cover 28, which is preferably molded to the configuration of the upper side of the pad 21, is superimposed upon the pad and secured to the base 20. The peripheral edge of the cover 28 is reverted, as shown in FIGURE 2, to form an inwardly inclined flange 30. A ring 32 is used to secure the cover 28 to the base 20 so as to absolutely prevent the escape of air from the interior of the cushion around the peripheral edge of the base 20, as will be explained below. The ring 32 is provided with an annular groove 34 adjacent the outer edge thereof which seats upon an upstanding flange 36 formed integrally with the base 20 along the peripheral edge 38 thereof. An annular flange 40 depends from the ring 32 along the inner edge thereof and terminates in a V-shaped tooth 42 conformably shaped to fit the contiguous portion 44 of the inner side 22 of the base 20.

When the cover 28 is in place, the reverted flange 30 extends past one leg 46 of the tooth 42 and around the other leg 48 of the tooth 42, as will be seen in FIGURE 7, whereby the pressure of the legs 46 and 48 against the contiguous portion 44 of the inner side of the base 20 will positively prevent the egress of air contained within the cover 28.

A reinforcing band 50 is superimposed upon the cover 28, as shown in FIGURE 3, with its outer edge held in place between the tooth 42 and the contiguous portion 44 of the inner side of the base 20, as will be seen in FIGURE 7. In the embodiment disclosed, the band takes the form of ornamental leaves 52 which act to limit the radial expansion of the pad 21 after impact. It is to be understood that the band may take many other decorative forms, and may cooperate with a design that may be placed on the exterior surface of the cover 28 to depict an illustration, or a safety slogan.

An air storage chamber 56 extends axially through the pad from the front side to the rear side, with the front end closed by the cover 28, as shown in FIGURE 4. Internally of the pad 21 is an annular rib or flange 54 which divides the air storage chamber 56 into a front section 58 and a rear section 60 communicating with the front section through a centrally located bore 62 which opens into the front and rear sections.

Projecting from the rear side of the pad 21 is an annular ridge 64 which defines the rear end of the air storage chamber and is seated within a depression 66 formed on the inner side of the base 21. Located centrally of the depression 66 is a cavity or air collection chamber 68 which is vented to the atmosphere through four radially extending air ports 70 which are equally or uniformly spaced about the cavity 68 and are of strictly calculated size. The air ports or egress passages extend from the cavity 68 through the base 20 and open to the atmosphere through the outer concave side 72 of the base 20. It has been found that for speeds in the range of 15–50 miles per hour, the safety cushion is highly effective with four air ports, each of 1/16 inch diameter.

The safety cushion 10 is firmly attached to the hub 12 of the steering wheel 14 by means of a clamp 74 having an inverted U-shape, as shown in FIGURE 2. The clamp 74 should be adjustable so as to fit the hub of different steering wheels and, to this end, is preferably constructed of resilient material such as spring steel. The clamp 74 consists of a center plate 76 and two bowed arms 78, 80 depending from the plate 76 and each has its free end bifurcated, as shown at 82, 84 so as to fit under the hub 12 and around the steering column 86 of the steering wheel 14.

The clamp 74 may be connected to the base 20 in numerous ways. In the embodiment shown in FIGURE 2, the connection is effected by four bolts 88 having their heads 90 positioned between the center plate 76 and a resilient spacer 92 carried by the clamp 74, with the threaded ends of the bolts 88 extending through bores 93 into openings 94 provided in the depression 66 of the base 20, and held in place by conventional means such as nuts 96. The spacer 92, which may be made of hard rubber, serves to make the connection of the clamp 74 to the hub 12 as firm as possible, allowing for slight differences in hubs which exist in steering wheels of different vehicles. Of course, the spacer also serves as a further impact absorbing means.

Recognizing that there may be more than minor variations between the hubs of steering wheels of different vehicles, another embodiment of the clamp is shown in FIGURES 8 and 9, and is designated by the reference numeral 98. This clamp is substantially identical in construction to that of clamp 74 with the exception of forming the arms 100 and 102 in two segments 103, 104, 105, and 106. The segments 103, 104, and the segments 105, 106 have longitudinally extending slots 107, 108 and 109, 110, respectively, which are aligned in pairs and, in cooperation with fasteners 112, permit the longitudinal extension or contraction of the arms 100, 102 to accommodate the clamp 98 to various size hubs. It will be noted that clamp 98 is also constructed from a center plate 76′ from which the arms 100, 102 extend with the free ends bifurcated, as shown at 82′, 84′. A resilient spacer 92′ is carried by the clamp 98 between the arms 100, 102, and bolts 88′ extend through the center plate 76′ for purposes of attachment of the clamp 98 to the base 20 by conventional attachment means such as nuts, not shown.

In the event it becomes necessary to disassemble the safety cushion 10, such as to replace the cover 28, access grooves 114 are formed in the peripheral edge of the base 20 for the insertion of a tool, such as a screw driver, to pry apart the ring 32 and the base 20.

FIGURES 10 and 11 show a modified form of the safety cushion 10. The construction thereof is identical to that shown in FIGURES 1–5 with the exception of the base, designated here as 116, and the clamp, designated here as 118.

The base 116 is formed with a depression 117 on the inner face 120 and a single cavity 122 located centrally thereof. The cavity 122 is vented to the atmosphere through four radially extending air ports 123, which are equally or uniformly spaced about the cavity 122 and are of strictly calculated size.

The clamp 118, having a generally inverted U-shape, consists of a center plate 124 and three bowed arms 126 depending from the plate 124 at spaced intervals so as to permit the arms to be located between the three spokes 130 of a steering wheel 128. The free ends of the arms 126 are bifurcated, as shown at 132, to fit under the hub 134 of the steering wheel and around the steering column 136.

The clamp 118 is connected to the base 116 by a single bolt 138 which has its head 140 positioned between the center plate 124 and a resilient spacer 142 carried by the clamp 118 between the arms 126. The threaded end of the bolt 138 extends through the bore 144, provided in the base 116 into the cavity 122, and is held in place by conventional means such as the nut 144.

In use, the safety cushion will be mounted upon the steering wheel of a vehicle or any other suitable portion of a vehicle. Upon sudden deceleration of the vehicle, such as upon a head-on collision, the driver or passenger will be hurled forwardly with considerable force and strike the front of the safety cushion whereupon the pad will begin to be compressed and the inherent resilient nature of the pad will enable it to absorb part of the impact force. Upon further compression of the pad, the internal annular flange 54 will be moved toward the rear of the cushion and the air contained within the storage chamber 56 will be urged rearwardly toward the energy dissipating means provided in the base 20, such means including a central air collection chamber or cavity 68 and a plurality of radially extending air ports or air passage means 70 communicating the cavity to the atmosphere.

The balance of the impact force, which remains unabsorbed by the pad 21, is then dissipated or absorbed by the gradual uniform expulsion of air from the storage chamber to the atmosphere through the air ports 70. The gradual absorption of the impact force slows down the forward movement of the driver's body in a uniform manner and, thereby, prevents the snapping movement of the head.

After the impact caused by the initial deceleration of the vehicle, there is the further problem which is usually associated with the complete stopping of the vehicle, viz., the reaction of the vehicle through the steering wheel, or other parts thereof, upon the driver or passenger which may also cause critical "whiplash" neck injuries and is part of the problem which has long sought solution. The safety cushion of the present invention solves this problem by preventing the instantaneous or immediate recovery of the pad. This is accomplished through the use of a plurality of radially extending air ports which control the reverse flow of air from the atmosphere to the interior of the pad so as to return the front of the cushion to its original position prior to impact in a gradual and uniform manner. The reverse flow of air is produced by the tendency of the resilient pad 20 to expand and return to its normal configuration, and by the differential in air pressure between the interior of the pad and the atmosphere resulting from the expanding movement of the pad.

The safety cushion of the present invention has been found effective not only for use on steering wheels, but also with an appropriate clamp or mounting on dashboards, and on the rear of the front seat of a vehicle, the latter position serving to protect passengers in the rear of the vehicle.

Thus, it is to be understood that while the best known forms of the present invention have been described and illustrated herein, other forms may be realized, as come within the scope of the appended claims.

Having thus described this invention, what is claimed is:

1. A safety cushion for vehicles comprising a base having an inner side and an outer side, a resilient pad secured to said base, said pad having an air storage chamber, energy dissipating means provided in said base cooperating with said pad to absorb an impact upon said pad by venting said air storage chamber to the atmosphere, said energy dissipating means including air passage means extending from said inner side of said base to said outer side of said base, and connecting means on said base adapted to be secured to a vehicle in confronting relation to an occupant thereof.

2. A safety cushion for vehicles comprising a base having an inner side and an outer side, a resilient pad secured to said base and having front and rear sides, said pad having an air storage chamber extending axially therethrough from the front side to the rear side, an impermeable flexible cover superimposed on and conformably shaped to fit said front side of said pad and secured to said base, energy dissipating means provided in said base cooperating with said pad to absorb an impact upon said pad by venting said air storage chamber to the atmosphere, said energy dissipating means including air passage means extending from said inner side of said base to said outer side of said base, and connecting means on said base adapted to be secured to a vehicle in confronting relation to an occupant thereof.

3. A safety cushion for vehicles comprising a base having an inner side and an outer side, a resilient pad secured to said base and having front and rear sides, said pad having an air storage chamber extending axially therethrough from the front side to the rear side, an impermeable flexible cover superimposed on and conformably shaped to fit said front side of said pad and secured to said base, energy dissipating means provided in said base cooperating with said pad to absorb an impact upon said pad by venting said air storage chamber to the atmosphere, said energy dissipating means including a central air collection chamber provided on the inner side of said base and a plurality of radially extending air ports communicating said central air collection chamber to the atmosphere, and connecting means on said base adapted to be secured to a vehicle.

4. A safety cushion for vehicles comprising a base having an inner side and an outer side, a resilient pad secured to said base and having front and rear sides, said pad having an air storage chamber extending axially therethrough from the front side to the rear side, an impermeable flexible cover superimposed on and conformably shaped to fit said front side of said pad and secured to said base, energy dissipating means provided in said base cooperating with said pad to absorb an impact upon said pad by venting said air storage chamber to the atmosphere, said energy dissipating means including a central air collection chamber provided on the inner side of said base and a plurality of radially extending air ports equally spaced about said central air collection chamber and communicating said central air collection chamber to the atmosphere, and connecting means on said base adapted to be secured to a vehicle.

5. A safety cushion for vehicles comprising a base having an inner side and an outer side, a resilient pad secured to said base and having front and rear sides, said pad having an air storage chamber extending axially therethrough from the front side to the rear side, an internal annular flange carried by said pad in said air storage chamber and dividing said chamber into a front section and a rear section communicating with said front section through a bore opening into each section, an impermeable flexible cover superimposed on and conformably shaped to fit said front side of said pad and secured to said base, energy dissipating means provided in said base cooperating with said pad to absorb an impact upon said pad by venting said air storage chamber to the atmosphere, said energy dissipating means including a central air collection chamber provided on the inner side of said base and a plurality of radially extending air ports equally spaced about said central air collection chamber and communicating said central air collection chamber to the atmosphere, and connecting means on said base adapted to be secured to a vehicle.

6. A safety cushion for vehicles comprising a base having an inner side and an outer side, a resilient pad secured to said base and having front and rear sides, said pad having an air storage chamber extending axially therethrough from the front side to the rear side, an internal annular flange carried by said pad in said air storage chamber and dividing said chamber into a front section and a rear section communicating with said front section through a bore opening into each section, an impermeable flexible cover superimposed on and conformably shaped to fit said front side of said pad and secured to said base, a reinforcing band superimposed on said cover adjacent the edge thereof and connected to said base, energy dissipating means provided in said base cooperating with said pad to absorb an impact upon said pad by venting said air storage chamber to the atmosphere, said energy dissipating means including a central air collection chamber provided on the inner side of said base and a plurality of radially extending air ports equally spaced about said central air collection chamber and communicating said central air collection chamber to the atmosphere, and connecting means on said base adapted to be secured to a vehicle.

7. In combination, a safety cushion for a vehicle's steering wheel having a hub, spokes extending from said hub, and a rim carried by said spokes; said safety cushion comprising a base, a resilient pad secured to said base, energy dissipating means contained wholly in said base cooperating with said pad to absorb an impact upon said pad by venting the interior of said pad to the atmosphere, and connecting means on said base detachably securing said safety cushion to said wheel.

8. In combination, a safety cushion for a vehicle's steering wheel having a hub, spokes extending from said hub, and a rim carried by said spokes; said safety cushion comprising a base, said base being positioned within said rim and over said hub and a major portion of the spokes, a resilient pad secured to said base, energy dissipating means contained wholly in said base cooperating with said pad to absorb an impact upon said pad by venting the interior of said pad to the atmosphere, and connecting means on said base detachably securing said safety cushion to said wheel.

9. In combination, a safety cushion for a vehicle's steering wheel having a hub, spokes extending from said hub, and a rim carried by said spokes; said safety cushion comprising a base, said base being positioned within said rim and over said hub and a major portion of the spokes, a resilient pad secured to said base, energy dissipating means provided in said base cooperating with said pad to absorb an impact upon said pad by venting the interior of said pad to the atmosphere, and a clamp depending from said base and having means at the free end thereof engageable behind said hub.

10. In combination, a safety cushion for a vehicle's steering wheel having a hub, spokes extending from said hub, and a rim carried by said spokes; said safety cushion comprising a base, said base being positioned within said rim and over said hub and a major portion of the spokes, a resilient pad secured to said base, energy dissipating means provided in said base cooperating with said pad to absorb an impact upon said pad by venting the interior of said pad to the atmosphere, and an adjustable clamp depending from said base including a center plate, a plurality of resilient arms embracingly receiving said hub, and a spacer mounted thereon between said arms and interposed between said center plate and said hub.

11. The structure of claim 9 wherein said last named means are movable lineally toward and away from said hub.

References Cited in the file of this patent

UNITED STATES PATENTS

| | | |
|---|---|---|
| 2,179,148 | Gerlofson | Nov. 7, 1939 |
| 2,649,311 | Hetrick | Aug. 18, 1953 |
| 2,750,996 | Cramer | June 19, 1956 |
| 2,781,203 | Kurilenko | Feb. 12, 1957 |
| 2,806,737 | Maxwell | Sept. 17, 1957 |
| 2,859,048 | Munn | Nov. 4, 1958 |
| 2,859,959 | Hardigg | Nov. 11, 1958 |
| 2,866,357 | Houghtaling | Dec. 30, 1958 |
| 2,906,366 | Mapes | Sept. 29, 1959 |
| 2,913,924 | Pratt | Nov. 24, 1959 |

FOREIGN PATENTS

| | | |
|---|---|---|
| 769,903 | France | June 11, 1934 |
| 1,090,586 | France | Oct. 20, 1954 |
| 1,115,317 | France | Dec. 26, 1955 |
| 1,150,606 | France | Aug. 12, 1957 |